Patented Feb. 12, 1935

1,991,283

UNITED STATES PATENT OFFICE 1,991,283

MANUFACTURE OF NEW STABLE ANTIMONY COMPOUNDS

Walter Kussmaul, Basel, Switzerland, assignor to the firm Chemical Works, formerly Sandoz, Basel, Switzerland No Drawing. Application June 27, 1931, Serial No. 547,451. In Germany July 12, 1930

4 Claims. (Cl. 260—11)

It is known that according to the processes described in the U. S. patent application Ser. No. 408,936, filed November 21, 1929, and in the U. S. patent application Ser. No. 547,175 filed June 26, 1931 by the same inventor valuable alkali metal- and polyvalent metal salts of antimonylpolyhydroxymonocarboxylic acids may be prepared.

In further development of these processes it has been found that valuable derivatives of antimonylpolyhydroxymonocarboxylic acids can be prepared when instead of the metal salts, the polyhydroxymonocarboxylic acid salts of the cinchona bark alkaloids are used for dissolving antimony oxyhydrates. The present invention consists, therefore, in dissolving antimony oxyhydrates in solutions of salts formed by interaction of cinchona bark alkaloids with polyoxymonocarboxylic acids derived from aldoses.

To carry out this process, for example the gluconic acid salts of cinchona bark alkaloids are dissolved in water and treated with antimonyoxyhydrates, whereby the antimonylgluconic acid salts of the cinchona bark alkaloids are obtained.

The new compounds can be isolated from their solutions by evaporation to dryness or by precipitating them with suitable organic solvents. They are easily water-soluble compounds, yielding more or less stable solutions, the stability of which may be increased by an addition thereto of alkali metal salts of polyhydroxymonocarboxylic acids. According to the basicity of the base used, the aqueous solutions of the compounds are neutral or slightly acid, whereby in the last case the acid reaction may easily be neutralized without any precipitation of the antimony oxyhydrate occurring. By treating their aqueous solutions with hydrogen sulphide a precipitation of antimony sulphide takes place.

It is also possible to prepare supersaturated stable solutions of the compounds prepared according to the present process, by subjecting their hot concentrated solutions contained in a hermetically closed vessel, to a repeated heating operation in the same manner as described in U. S. Patent 1,865,141.

The compounds prepared according to the present process may be used for therapeutical purposes, as they possess bactericidal and antiparasitic properties. Their manufacture may be illustrated by the following example, the parts being by weight.

Its probable constitution is the following:

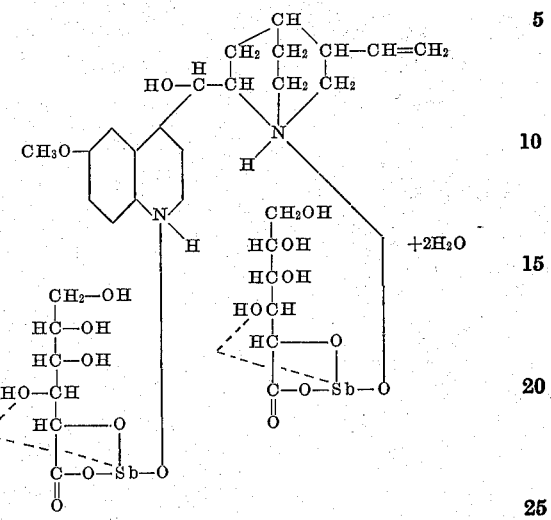

To a solution of 10.4 parts of quininemonogluconate in 20 parts of water are added 7.2 cc. of aqueous gluconic acid of 54.5 volume per cent and the solution obtained is shaken with 8.3 parts of antimony oxyhydrate. The undissolved part is then separated by centrifugation and the clear solution obtained evaporated in vacuo to dryness. In this manner 20.5 parts of a nearly colorless powder, easily soluble in water with a bluish fluorescence are obtained. It contains 23.1% of Sb and 31.6% of quinine. The theoretical content for the formula $C_{32}H_{50}O_{20}N_2Sb_2$, mol. weight 1026, would be of 23.8% of Sb and of 31.6% of quinine.

What I claim is:—

1. A process for the preparation of organic antimony compounds, yielding with water stable solutions, consisting in dissolving antimony oxyhydrates in solutions of salts formed by interaction of quinine with polyhydroxymonocarboxylic acids derived from aldoses.

2. A process for the preparation of an organic antimony compound, yielding with water clear and stable solutions, consisting in dissolving antimony oxyhydrate obtained from tartar emetic in an aqueous solution of quinine gluconate.

3. The quinine salts of antimonyl polyhydroxy-monocarboxylic acids, which constitute in dry state colorless powders, soluble in water, yielding stable solutions, and more or less soluble in organic solvents and which yield, when treated with hydrogen sulphide, precipitates of antimony sulphides.

4. The quinine antimonyl gluconate, which constitutes in dry state a colorless compound, easily soluble in water with a bluish fluorescence, yielding stable solutions, which when treated with hydrogen sulphide yield a precipitate of antimony trisulphide, and which contains about 23 per cent of antimony.

WALTER KUSSMAUL.

CERTIFICATE OF CORRECTION.

Patent No. 1,991,283.                                                          February 12, 1935.

WALTER KUSSMAUL.

It is hereby certified that error appears in the printed specification of the above numbered patent requiring correction as follows: Page 1, second column, lines 3 to 25 inclusive, the words "Its probable constitution is the following:" and the formula, should be inserted after line 40, of same page and column, instead of as lines 3 to 25; and that the said Letters Patent should be read with this correction therein that the same may conform to the record of the case in the Patent Office.

Signed and sealed this 11th day of June, A. D. 1935.

Leslie Frazer (Seal)                                             Acting Commissioner of Patents.